(12) United States Patent
Johansson et al.

(10) Patent No.: US 9,648,253 B2
(45) Date of Patent: May 9, 2017

(54) PROCEDURE FOR MAPPING WHEN CAPTURING VIDEO STREAMS BY MEANS OF A CAMERA

(71) Applicant: FLIR Systems AB, Täby (SE)

(72) Inventors: Emanuel Johansson, Wellington (SE); Odd Larson, Alvsjo (SE)

(73) Assignee: FLIR Systems AB, Taby (SE)

( * ) Notice: Subject to any disclaimer, the term of this patent is extended or adjusted under 35 U.S.C. 154(b) by 216 days.

(21) Appl. No.: 14/439,941

(22) PCT Filed: Oct. 30, 2013

(86) PCT No.: PCT/SE2013/000166
§ 371 (c)(1),
(2) Date: Apr. 30, 2015

(87) PCT Pub. No.: WO2014/070062
PCT Pub. Date: May 8, 2014

(65) Prior Publication Data
US 2015/0288891 A1 Oct. 8, 2015

(30) Foreign Application Priority Data
Nov. 1, 2012 (SE) ..................................... 1230112

(51) Int. Cl.
*H04N 7/18* (2006.01)
*H04N 5/33* (2006.01)
*H04N 17/00* (2006.01)

(52) U.S. Cl.
CPC ............. *H04N 5/33* (2013.01); *H04N 17/002* (2013.01)

(58) Field of Classification Search
CPC .............................. H04N 5/33; H04N 17/002
(Continued)

(56) References Cited

U.S. PATENT DOCUMENTS 8,373,757 B1* 2/2013 Nguyen ................... H04N 5/33
250/252.1
2003/0183765 A1 10/2003 Chen et al.
(Continued)

FOREIGN PATENT DOCUMENTS

EP 0 601 534 6/1994
WO WO 2008/107117 9/2008

*Primary Examiner* — Allen Wong
(74) *Attorney, Agent, or Firm* — Haynes and Boone, LLP

(57) ABSTRACT

The invention relates to a procedure for mapping when capturing video streams by means of a camera, such as an IR camera, as well as to a computer program and a computer program product. According to the procedure the following items are included: a) at least two reference images are recorded in production against a black-body radiator at the same temperature for two or more separate integration times (block 3), b) in conjunction with the updating of an offset map, details of the integration time for which the offset map has been updated are stored (block 6), c) during operation, the actual integration time is compared with the integration time for the most recent updating of the offset map (block 8), d) the recorded reference image which lies closest to the actual integration time is selected as a reference (block 7), and e) a compensation per pixel for the change in the integration time is calculated by linear interpolation between the selected reference image and the most recently updated offset map, resulting in a compensation map (block 8). The integration time can be adapted dynamically by the procedure with access to adequate maps for correction of the offset of constituent pixels.

14 Claims, 2 Drawing Sheets

(58) Field of Classification Search
USPC .......................................................... 348/135
See application file for complete search history.

(56) References Cited

U.S. PATENT DOCUMENTS

| | | | |
|---|---|---|---|
| 2005/0024639 A1* | 2/2005 | Fretel | G01J 3/2803 |
| | | | 356/326 |
| 2011/0164139 A1 | 7/2011 | Ekdahl | |
| 2012/0133776 A1* | 5/2012 | Cicchi | H04N 5/33 |
| | | | 348/164 |
| 2012/0200714 A1 | 8/2012 | Minassian et al. | |
| 2012/0300904 A1* | 11/2012 | Shimada | A61B 6/4291 |
| | | | 378/62 |

* cited by examiner

PROCEDURE FOR MAPPING WHEN CAPTURING VIDEO STREAMS BY MEANS OF A CAMERA

TECHNICAL FIELD

The present invention relates to a procedure for mapping when capturing video streams by means of a camera, such as an IR camera, as well as to a computer program and a computer program product.

BACKGROUND

The output signal from sensor elements in a sensor, such as a focal plane array, IR FPA, contained in a camera can vary quite considerably as a function of the irradiated effect. Sensor elements thus require to be calibrated with one another. The sensor elements contained in a sensor in an IR camera do not behave in the same way, for example, but exhibit variations in gain and offset. In order to manage these variations, so-called gain maps and offset maps are recorded and stored in production. With the help of the gain map, corrections are made during operation for variations in gain in the individual sensor elements in a sensor. The offset map is used correspondingly to shift the sensor signals of the constituent sensor elements in parallel during operation, so that the gain curves of the detectors substantially coincide. To further illustrate the principles behind gain and offset mapping, reference is made to our published US Patent Application US 2011/0164139 A1.

Cameras of the IR type have traditionally made use of a plurality of fixed integration times to cover the camera's dynamic range. Every such fixed position has been provided with its own maps. The disadvantage of fixed integration times is that deviations in the image quality are necessary in order to be able to cover a particular dynamic range, since the image quality is optimized only at a single scene temperature. Several fixed integration time positions have been introduced in order to increase the image quality, which improves the image quality at the expense of higher complexity but still does not fully cover optimal integration time positions.

An alternative to fixed integration times is to change the integration time dynamically. One disadvantage associated with this is that it involves making a shift away from the integration time which was relevant at the time when the maps were made. This shift away from the integration time at the time when the maps were made gives rise to a low-frequency unevenness of the image. An extra spatial fixed-pattern noise is generated and is visible in low-contrast scenes. A previously known solution to this has been to permit the integration time to be changed only in conjunction with the offset map being updated by a so-called NUC, on uniformity correction. In order for it to function adequately, the solution requires an NUC to be performed as soon as the scene has changed significantly, for example when panning.

For an example of the prior art where the integration time is changed, reference can be made to WO 2008/107117 A1, which describes a procedure for changing the integration time depending on the temperature of an IR sensor.

SUMMARY OF THE INVENTION

The object of the present invention is to make available a procedure which adapts the integration time dynamically on the basis of the scene content in order to achieve maximum quality in every scene without the need for constant updates of maps by NUC processing and without having to store maps for a large number of fixed integration times.

The object of the invention is accomplished by a procedure that is characterized:

a) in that at least two reference images are recorded in production against a black-body radiator at the same temperature for two or more separate integration times, b) in that, in conjunction with the updating of an offset map, details of the integration time for which the offset map has been updated are stored, c) in that, during operation, the actual integration time is compared with the integration time for the most recent updating of the offset map, d) in that the recorded reference image which lies closest to the actual integration time is selected as a reference, e) in that a compensation per pixel for the change in the integration time is calculated by linear interpolation between the selected reference image and the most recently updated offset map, resulting in a compensation map, and f) in that the compensation map is added to an incoming video image.

The use of reference images, the most recent updating of the offset map and its integration time, as well as linear interpolation, permits a compensation map to be created which corresponds closely to the actual integration time. The procedure permits the integration time to be changed continuously and entirely automatically without needing to undergo a further NUC process.

The compensation map is advantageously standardized before addition by deducting the mean value of the compensation map from all the pixels for centring of the compensation map around zero.

Alternatively, the reference images can be standardized before the interpolation takes place by deducting the mean value of the reference image from all the pixels for centring of the reference image around zero.

According to an advantageous procedure, specifically two reference images are recorded in production against a black-body radiator at the same temperature for two separate integration times. By restricting the number of reference images to two, the mapping process can be kept relatively simple from the point of view of storage and calculation.

According to the proposed procedure, the reference images can suitably be taken for integration times within the millisecond range and with a difference in the integration time in the order of 10 milliseconds.

The invention also relates to a computer program comprising program code, which, when the said program code is executed in a computer, causes the said computer to carry out the procedure as described above in order to accomplish the object of the invention, as well as to a computer program product comprising a computer-readable medium and a computer program as described above, the said computer program being included in the said computer-readable medium.

BRIEF DESCRIPTION OF THE DRAWINGS

The invention is described below in more detail by way of example with reference to the accompanying drawings, in which.

DETAILED DESCRIPTION OF THE EMBODIMENT

Figure 1:
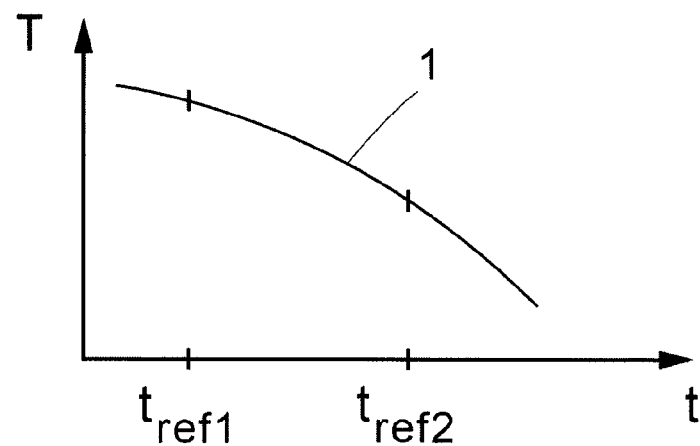
FIG. 1 depicts schematically an example of a curve which shows the scene temperature as a function of the integration time for optimized image quality.

The curve 1 depicted in FIG. 1 depicts an example of the scene temperature T as a function of the integration time t for optimized image quality. Two fixed integration times $t_1$ and $t_2$ are plotted in the Figure. According to the known method, an individual map is connected to each integration time. In the event that another suitable integration time is used, a shift will take place from the integration times for which the maps were produced, and low-frequency unevennesses of the image will occur as a result. According to the proposed procedure for mapping, which is described in more detail with reference to FIG. 2, compensation maps are generated which offer relevant mapping along the scene temperature curve between fixed references.

The principles for mapping according to the procedure of the invention are now described with reference to FIG. 2.

An incoming video stream is available through a block 2. The stream can be supplied from the sensor part of an IR camera, the said sensor part comprising, for example, one or a plurality of focal plane arrays. The actual integration time for the video stream is designated with $t_p$.

A block 3 marks the availability of two reference images taken in production. The images have been taken on a black-body radiator at the same temperature for two different integration times. The first reference image is designated here as $B_{ref1}$ and was taken with an integration time $t_{ref1}$, which in one example here can amount to 3 ms. The other reference image is designated as $B_{ref2}$ and was taken with an integration time $t_{ref2}$, which in the example here can amount to 14 ms. The reference image $B_{ref1}$ is marked as being stored in block 4, while reference image $B_{ref2}$ is marked as being stored in block 5.

During the operation of an IR camera, calibrations of the camera are performed during a known process known as NUC, non uniformity correction. A block 6 indicates this NUC process. In this NUC process, the integration time, $t_{nuc}$, with which the NUC process was carried out is saved in addition to the most recent map. The block 6 thus provides both the most recent map and the most recent integration time $t_{nuc}$.

A block 7 manages the choice of the next reference image. If $$|t_{ref1}-t_p|<|t_{ref2}-t_p|,$$

reference image $B_{ref1}$ is selected because it lies closest to the new actual integration time $t_p$. Otherwise, reference image $B_{ref2}$ is selected because it is then considered to lie closest to the new actual integration time $t_p$.

If the integration time is to be changed, the actual integration time $t_p$ is compared with the integration time $t_{nuc}$ from the most recent NUC, and the reference which lies closest to the new actual integration time $t_p$ is selected as a reference image and is provided by the block 7.

In the block 8, a compensation per pixel is calculated by linear interpolation between the selected reference image, either reference image $B_{ref1}$ or $B_{ref2}$, and the map from the most recent NUC. The result of the calculation is a map that is referred to in this description as a compensation map. A block 9 undertakes standardization of the correction map before it is added via an adder 10 to the incoming video stream from the block 2 in order to deliver a video stream through a block 11. The output video stream can be connected, for example, to a display for presentation or to a memory medium for storage. A display and a memory medium are not shown in the Figure.

Figure 2:
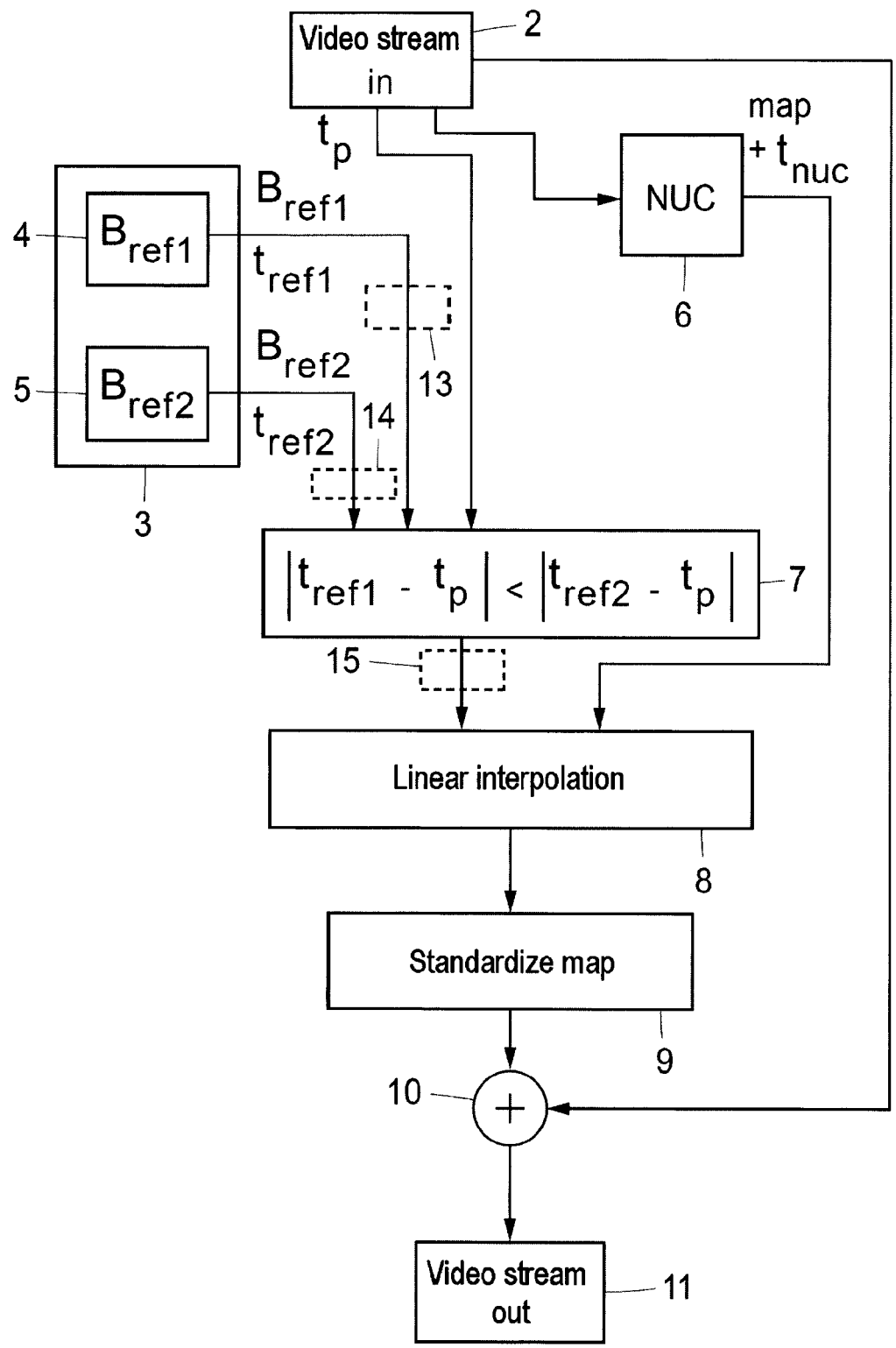
FIG. 2 depicts schematically an example in the form of a block diagram of the principles for mapping according to the procedure of the invention.

Alternatively, standardization of the reference image can be undertaken before interpolation, and two possible positions of a block for the standardization of reference image $B_{ref1}$ are indicated with dashed blocks 13 and 15 in FIG. 2. Two dashed blocks 14 and 15 likewise indicate two possible positions of a block for the standardization of reference image $B_{ref2}$.

Figure 3:
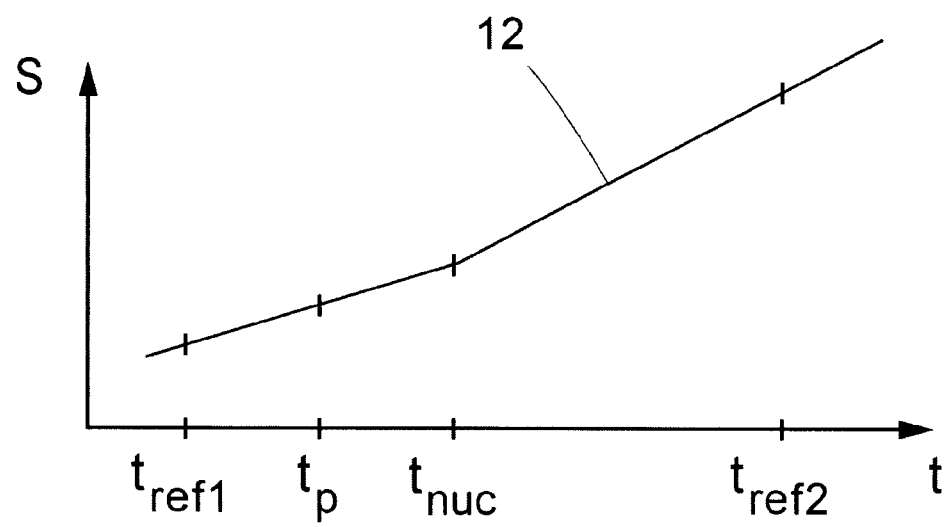
FIG. 3 depicts schematically an example of a curve which shows the signal per pixel as a function of the integration time for a pixel which has undergone the mapping according to the procedure of the invention.

The result of linear interpolation per pixel is illustrated schematically in FIG. 3. The signal S per pixel is shown on the curve 12 as a function of the integration time t. The integration times $t_{ref1}$ and $t_{ref2}$ for the reference images $B_{ref1}$ and $B_{ref2}$ are plotted along the time axis t together with the integration time $t_{nuc}$ for the most recent NUC. The actual integration time $t_p$ is plotted in addition. In the illustrated example, reference image $B_{ref1}$ is closer to the actual integration time $t_p$ than reference image $B_{ref2}$. In line with what has been described with reference to the block 8 in FIG. 2, a linear interpolation is made between the reference image $B_{ref1}$ with an integration time $t_{ref1}$ and the map from the most recent NUC with an integration time $t_{nuc}$.

The invention is described above with reference to a schematic block structure depicted in FIG. 2. This description must be regarded only as an explanation of the fundamental structure. The execution of the described functions can be performed in many ways within the framework of the invention, and attention is brought particularly to the use of a computer program for the implementation of the functions.

The invention is not restricted to the procedures described above as examples, but may be subjected to modifications within the scope of the following patent claims.

The invention claimed is:

1. A method for mapping when capturing video streams with a camera the method comprising:
    recording at least two reference images in production against a black-body radiator at a same temperature for two or more separate integration times;
    storing, in conjunction with an updating of an offset map, details of an integration time for which the offset map has been updated;
    comparing, during operation, an actual integration time with the integration time for a most recent updating of the offset map;
    selecting a recorded reference image, which lies closest to the actual integration time, as a reference;
    calculating a compensation per pixel, for a change in the integration time, by linear interpolation between the selected reference image and the most recently updated offset map, resulting in a compensation map; and
    adding the compensation map to an incoming video image.

2. The method according to claim 1, wherein the compensation map is standardized before addition by deducting a mean value of the compensation map from all the pixels for centring of the compensation map around zero.

3. The method according to claim 1, wherein the reference images are standardized before the interpolation takes place by deducting the mean value of the reference images from all the pixels for centring of the reference image around zero.

4. The method according to claim 3, wherein two reference images are recorded in production against a black-body radiator at the same temperature for two different integration times.

5. The method according to claim 4, wherein the reference images are taken for integration times within the millisecond range and with a difference in the integration time in the order of 10 milliseconds.

6. A computer program product comprising program code stored in a non-transitory computer readable medium, wherein when the program code is executed in a computer the computer is configured to carry out the method of claim 1.

7. The method of claim 1, wherein the camera is an infrared camera.

8. An infrared camera configured to perform the method of claim 1.

9. A method of processing infrared data, the method comprising:
    comparing, during operation, an actual integration time with an integration time for a most recent updating of an offset map;
    selecting a recorded reference image, which lies closest to the actual integration time, as a reference;
    calculating a compensation per pixel, for a change in the integration time, by linear interpolation between the selected reference image and the most recently updated offset map, resulting in a compensation map; and
    adding the compensation map to an incoming video image.

10. The method according to claim 9, wherein the compensation map is standardized before addition by deducting a mean value of the compensation map from all the pixels for centring of the compensation map around zero.

11. The method according to claim 9, wherein the reference images are standardized before the interpolation takes place by deducting the mean value of the reference images from all the pixels for centring of the reference image around zero.

12. The method according to claim 11, wherein two reference images are recorded in production against a black-body radiator at the same temperature for two different integration times.

13. The method according to claim 12, wherein the reference images are taken for integration times within the millisecond range and with a difference in the integration time in the order of 10 milliseconds.

14. A non-transitory computer-readable medium encoded with executable instructions for performing a method of mapping when capturing video streams with a camera, wherein the method comprises:
    comparing, during operation, an actual integration time with an integration time for a most recent updating of an offset map;
    selecting a recorded reference image, which lies closest to the actual integration time, as a reference;
    calculating a compensation per pixel, for a change in the integration time, by linear interpolation between the selected reference image and the most recently updated offset map, resulting in a compensation map; and
    adding the compensation map to an incoming video image.

* * * * *